(12) United States Patent
Crowley

(10) Patent No.: US 6,268,724 B1
(45) Date of Patent: Jul. 31, 2001

(54) DEVICE FOR SELECTIVELY DETECTING METAL OBJECTS

(75) Inventor: Christopher W. Crowley, San Diego, CA (US)

(73) Assignee: Quantum Magnetics, San Diego, CA (US)

( * ) Notice: Subject to any disclaimer, the term of this patent is extended or adjusted under 35 U.S.C. 154(b) by 0 days.

(21) Appl. No.: 09/338,351

(22) Filed: Jun. 21, 1999

(51) Int. Cl.[7] .................................................. G01N 27/72
(52) U.S. Cl. ........................... 324/243; 324/225; 324/239; 340/551
(58) Field of Search .................................. 324/239, 243, 324/225, 326, 327, 328, 329, 233, 241, 242; 340/551, 572.4, 572.5, 572.6; 209/567

(56) References Cited

U.S. PATENT DOCUMENTS

| | | |
|---|---|---|
| 3,165,691 | 1/1965 | McClanahan . |
| 3,397,364 | 8/1968 | Crandall . |
| 3,471,772 | 10/1969 | Smith . |
| 3,882,374 | 5/1975 | McDaniel . |
| 3,889,249 | 6/1975 | Bennett, Jr. et al. . |
| 4,024,468 | 5/1977 | Hirschi . |
| 4,030,026 | 6/1977 | Payne . |
| 4,110,679 | 8/1978 | Payne . |
| 4,128,803 | 12/1978 | Payne . |
| 4,255,711 | * 3/1981 | Thompson ............................ 324/329 |
| 4,325,027 | 4/1982 | Dykstra et al. . |
| 4,486,713 | 12/1984 | Gifford . |
| 4,611,127 | 9/1986 | Ibrahim et al. . |
| 4,647,910 | 3/1987 | Torre . |
| 4,659,989 | 4/1987 | Kerr . |
| 5,001,425 | 3/1991 | Beling et al. . |

* cited by examiner

Primary Examiner—Walter E. Snow
(74) Attorney, Agent, or Firm—Nydegger & Associates

(57) ABSTRACT

A device for detecting random objects that are being carried inside a container includes an excitation coil and a sensing coil with a gap therebetween. When the construction of the container includes a conducting loop, the container is positioned on a path between the two coils, with the plane of the loop substantially perpendicular to the path. The excitation coil is then activated to generate a magnetic field that is directed along the path. This magnetic field has both a sinusoidal component and a cosinusoidal component. Importantly, the cosinusoidal component is adjusted to match a characteristic dimension of the loop, to thereby cause zero mutual inductance with the loop in the magnetic field. On the other hand, conducting objects inside the loop will cause inductance perturbations in the magnetic field which can be detected to establish the presence of the objects in the container.

20 Claims, 2 Drawing Sheets

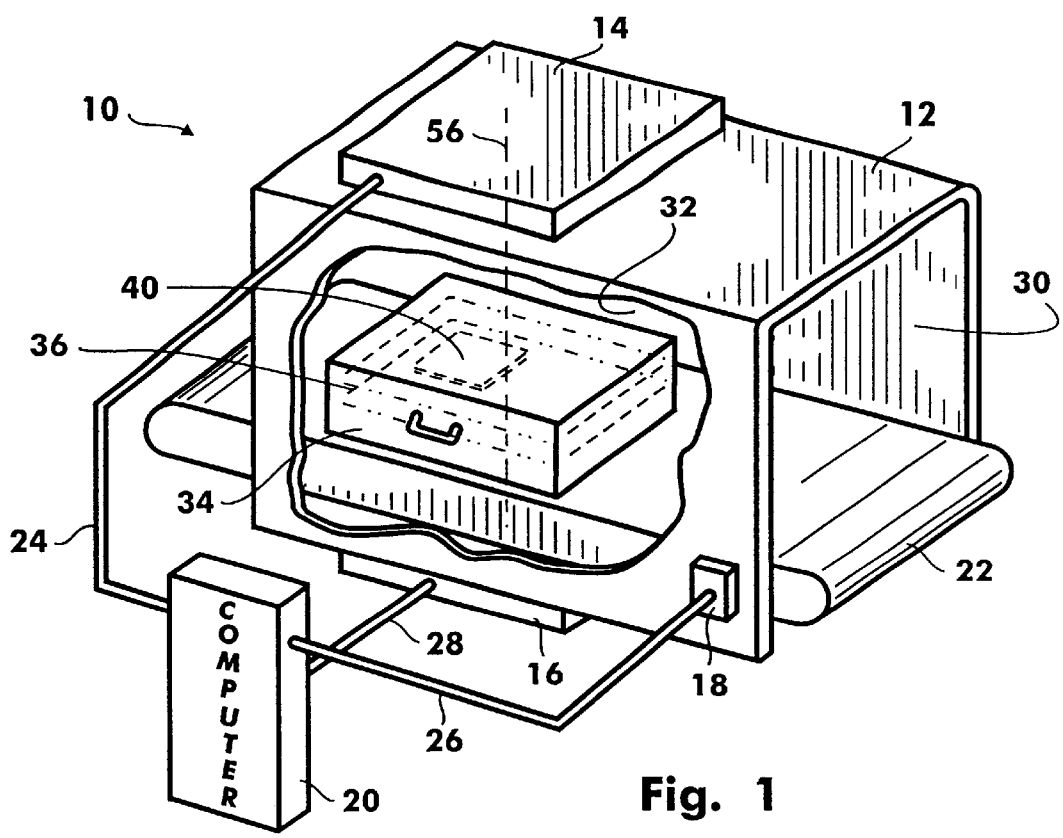
Fig. 1
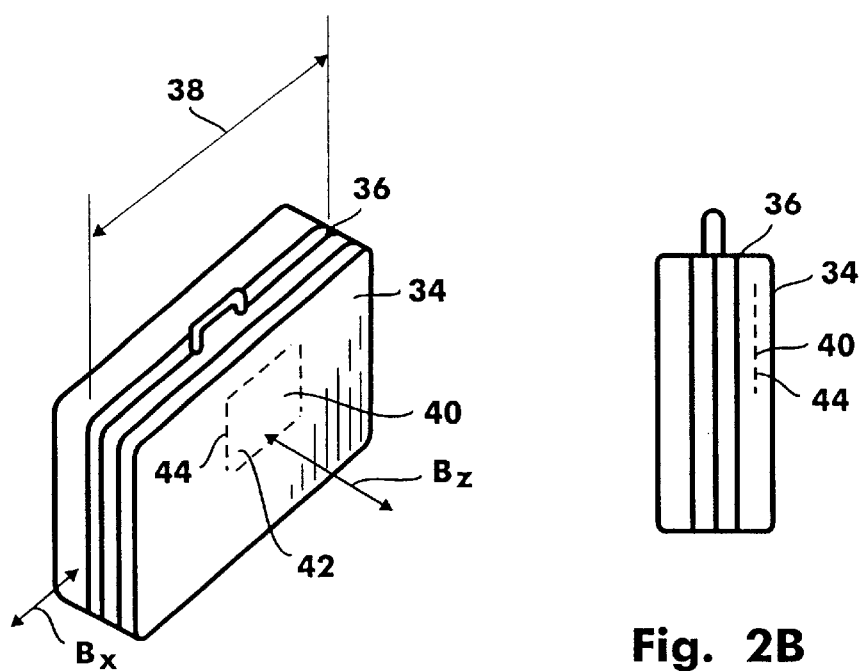
Fig. 2A
Fig. 2B

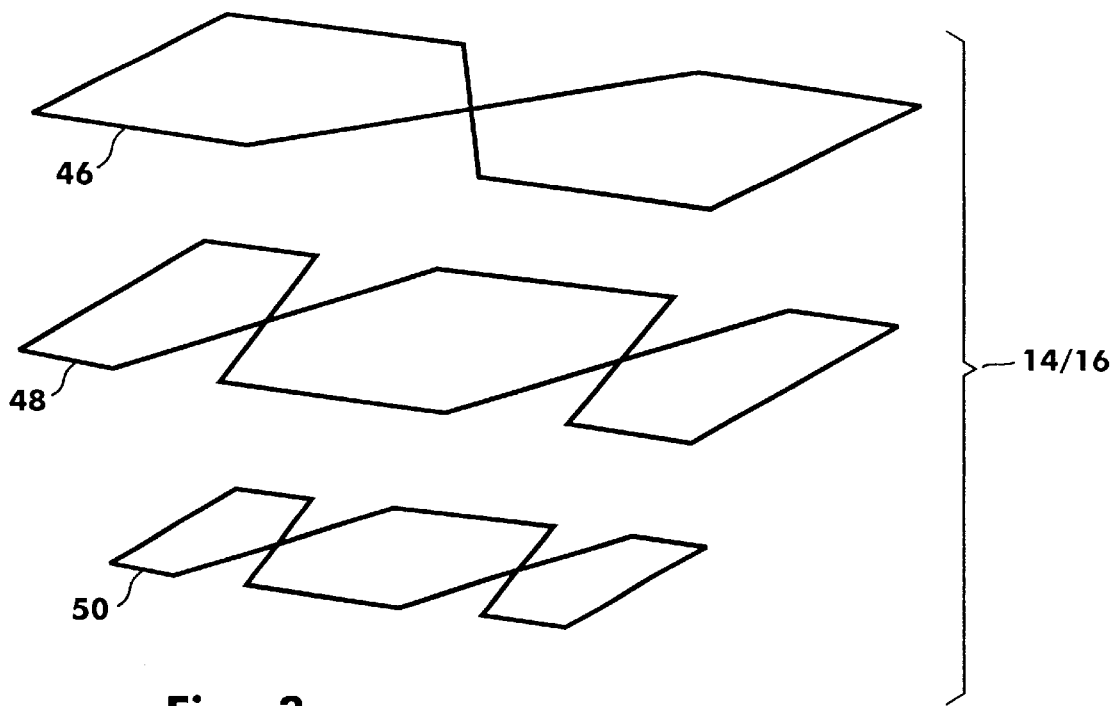
Fig. 3
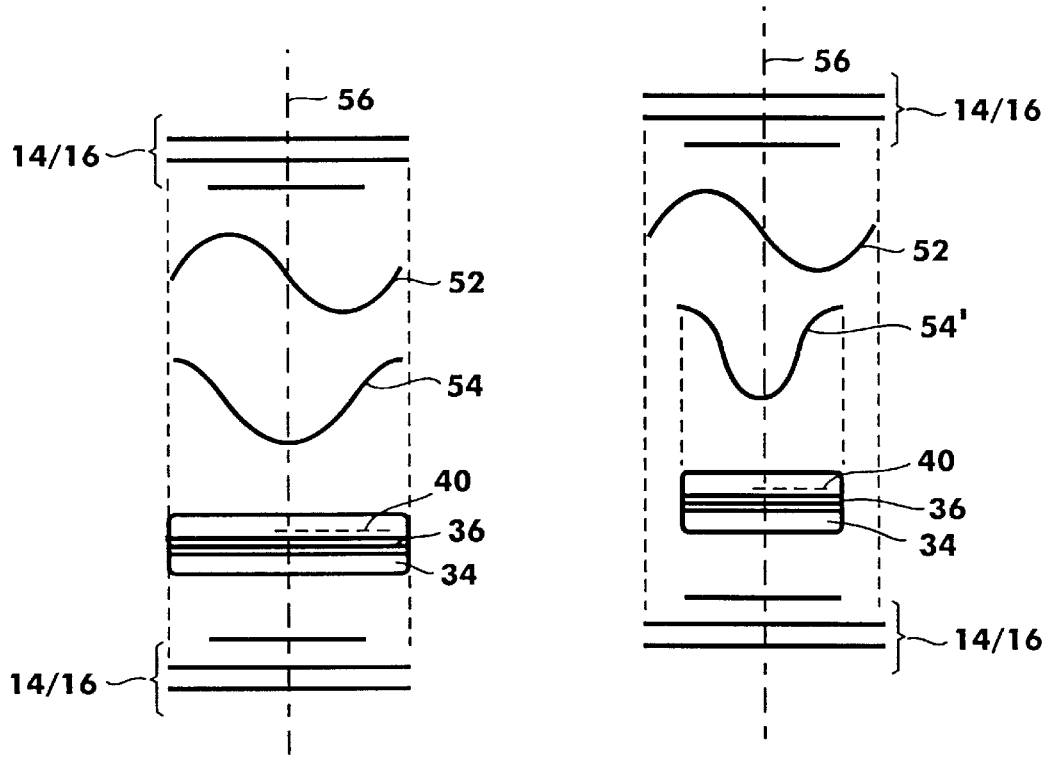
Fig. 4A  Fig. 4B

DEVICE FOR SELECTIVELY DETECTING METAL OBJECTS

FIELD OF THE INVENTION

The present invention pertains generally to detection devices and their methods of operation. More particularly, the present invention pertains to devices and methods for removing unwanted interference from detection signals. The present invention is particularly, but not exclusively, useful as a device for the detection of flat conducting objects which are carried in suitcases that have a reinforcing metallic frame.

BACKGROUND OF THE INVENTION

Magnetic detection devices generally rely on the phenomenon which results when a conducting material, such as a metallic object, is positioned in a magnetic field. Specifically this phenomenon involves inductance coupling between the detection device and the conducting material (object) whereby a changing current in one (the detection device) induces a current in the other (the object). The inducement in this case is caused by a magnetic field (B) which is generated by the changing current in the detection device. In response, a current is induced in the object which will alter the magnetic field (B). Magnetic detection devices are useful for finding hidden or concealed objects because the alterations in the magnetic field that result from inductance coupling are detectable.

Although metal detection devices are efficacious in many circumstances, it happens that a conducting material which is configured as a sheet (i.e. the sheet is flat) can not be so easily detected when it is oriented edgewise with its flat surfaces substantially parallel to the magnetic flux lines in a magnetic field. Further, even when flat conducting materials are oriented with their surfaces perpendicular to the magnetic flux lines, interference from other conductors can effectively prevent detection of the target material. Specifically, it is known that the loop-like metallic frames which are used for reinforcing large suitcases will cause substantial interference in a magnetic field. Consequently, a flat, sheet-shaped electrically conducting object which is carried in a reinforced suitcase will not be detected by magnetic detection techniques.

Inductance coupling is effectively nullified if there is zero mutual inductance (M=0). As a practical matter this will occur even when a conducting material is located in a magnetic field if the flux into the object ($\Phi_{in}$) is equal to the flux that is coming out of the object ($\Phi_{out}$). Stated differently, M=0 when, $\Phi_{in}=\Phi_{out}$. Under this condition, the object will not cause an alteration of the magnetic field. Thus, no detectable signals will be generated and the object will be effectively invisible.

In light of the above, it is an object of the present invention to provide a device and method for detecting random conducting objects which are located inside a conducting loop which generates a magnetic field that exhibits substantially zero mutual inductance with the loop and thereby effectively eliminates the effect of the loop during the detection of the objects inside the loop. It is another object of the present invention to provide a device and method for detecting random conducting objects that are located inside a conducting loop wherein the mutual inductance between the detecting magnetic field and the loop can be adjusted to zero. Still another object of the present invention is to provide a device and method for detecting random conducting objects located inside a conducting loop regardless whether the objects are sheet-like or have a more three dimensional volumetric shape. It is also an object of the present invention to provide a device for detecting random conducting objects located inside a conducting loop which is easy to use, relatively simple to manufacture, and comparatively cost effective.

SUMMARY OF THE PREFERRED EMBODIMENTS

A device for detecting random conducting objects that are located inside a conducting loop, such as the reinforcing metallic frame of a suitcase, includes an array of excitation coils and an array of sensing coils. Both of these arrays are mounted on a base member and are separated from each other by a gap therebetween. Additionally, the present invention includes a computer which is electronically connected with both of the arrays. Specifically, the computer is used to electronically control the generation of a magnetic field with the array of excitation coils, and to analyze perturbations in the magnetic field as they are received by the array of sensing coils. As intended for the present invention, the magnetic field is respectively generated and sensed by an array of excitation coils and an array of sensing coils which are of substantially the same configuration. In accordance with the principle of reciprocity, those skilled in the art will recognize that the excitation coils and the sensing coils are interchangeable.

It is an important operational aspect of the present invention that in the operation of the device of the present invention, a conducting loop will be eliminated from detection and yet not interfere with the detection of other objects by the device. Specifically, any conducting objects that may be inside the loop, need to be detected. This is effectively accomplished by using the excitation coils to generate a magnetic field which will have no mutual inductance with the loop. For the present invention, this is done be generating a magnetic field whose spatial intensity pattern includes both a sinusoidal component and an adjustable cosinusoidal component. The result obtained by using both of these components is that the flux entering the loop ($\Phi_{in}$) can be made equal to the flux coming out of the loop ($\Phi_{out}$). As noted above, under these conditions the mutual inductance due to the loop is zero ($\Phi_{in}=\Phi_{out}$, and M=0).

In order to generate the sinusoidal and cosinusoidal components for the magnet field for the device of the present invention, the array of excitation coils is configured to include two cosine coils and one sine coil. Both of the cosine coils are connected with the computer so that the cosinusoidal component of the magnetic field can be adjusted to conform or match its spatial intensity pattern with a characteristic dimension of the loop. Consequently, when the matched magnetic field is directed along a path that is substantially perpendicular to the plane of the loop, $\Phi_{in}$ will equal $\Phi_{out}$ and there will be zero mutual inductance with the loop (M=0). On the other hand, any inductance caused by objects inside the loop will create perturbations in the magnetic field which can be detected. Because of the fundamental mathematical relationship, $\sin^2+\cos^2=1$, these perturbations are substantially uniform regardless of their location within the loop.

For the present invention, the sinusoidal component is preferably alternated with the cosinusoidal component somewhere between ten and one hundred times each second. The signals that are then respectively obtained in response to the alternated components are summed by the computer to obtain information about objects in the magnetic field.

In the operation of the present invention, a suitcase, luggage bag or any other type container which may be used for transporting objects is placed on a conveyor belt. Specifically, the suitcase, bag or container is placed on the conveyor belt so that any reinforcing metallic loops will be oriented substantially parallel to the conveyor belt. The suitcase, bag or container is then advanced on the belt through the base member of the device to a position between the excitation coils and the sensing coils. As it is so advanced, a device such as an optical encoder is used to measure a characteristic dimension, e.g. length, of the metallic loop is the suitcase, bag or container. With this characteristic dimension, the computer is then used to adjust either the excitation coils or the sensing coils, or both sets of coils, so that the cosinusoidal component of the magnetic field is matched with the characteristic dimension of the suitcase, bag or container.

When the suitcase, bag or container arrives on the conveyor belt at the predetermined position in the device where it is to be inspected, the excitation coils are activated and readings are taken by the sensing coils. In accordance with the above description of the present invention, any conducting loop(s) in the suitcase, bag or container will not cause an reading. On the other hand, objects inside the loop will provide readings which can be used by the computer to confirm detection of the object.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1 is a perspective view of the device of the present invention with portions broken away for clarity;

FIG. 2A is a perspective view of a suitcase with objects carried therein shown in phantom;

FIG. 2B is a side elevational view of the suitcase shown in FIG. 2A;

FIG. 3 is an exploded perspective view of an array of coils as used for the present invention;

FIG. 4A is a schematic drawing showing the relationship between coils, the spatial intensity patterns of sinusoidal and cosinusoidal components of the magnetic field that is generated by these coils, and a suitcase being inspected by the device of the present invention; and FIG. 4B is a schematic drawing as shown in FIG. 4A with an adjustment made to the cosinusoidal component.

DESCRIPTION OF THE PREFERRED EMBODIMENT

Referring initially to FIG. 1, a device for detecting objects in accordance with the present invention is shown and generally designated 10. As shown, the device 10 includes an elongated base 12 which has open ends. The device 10 also includes excitation coils 14 which are mounted on the top of the base 12 and sensing coils 16 which are mounted on the bottom of the base 12. There is also a dimension detector 18 that is mounted on the base 12, and the device 10 further includes a computer 20 which is electronically connected to various of the components just disclosed. Specifically, the computer is electronically connected to the excitation coils 14 via a line 24, to the dimension detector 18 via a line 26 and to the sensing coils 16 via a line 28. Finally, the device 10 includes a conveyor belt 22 which extends between the ends of the base 12, and which can be selectively activated to carry containers, bags, suitcases and the like through the device 10. Specifically, such articles are carried through a detection chamber 30 that is formed in the base 12, and through a gap 32 that is established in the detection chamber 30 between the excitation coils 14 and the sensing coils 16.

In FIG. 2A, the suitcase 34 that is shown is of a type which is constructed to include a loop(s) 36. Typically, the loop(s) 36 are for purposes of reinforcing the suitcase 34 and will be made of a metallic material. Thus, loop 36 will be a conductor. Further, FIG. 2A shows that the suitcase 34 has a characteristic dimension 38. In this particular case the characteristic dimension 38 is the length of the suitcase 34. Importantly, in all cases, the characteristic dimension 38 of any container will typically be the longest dimension of the loop 36. As shown for the suitcase 34, the loop 36 is generally planar in its configuration and, for the purposes of the present invention, the suitcase 34 (or other container) can include a plurality of loops 36.

FIG. 2A also shows an object 40 being carried inside the suitcase 34. For purposes of disclosure, it will be assumed that the object 40 is flat or sheet-like, and that it is made of a conductive material, such as a metallic foil. When inside the container 34, the object 40 is also inside the loop 36.

In accordance with well known metal detecting practices, it is known that when the x component of a magnetic field, $B_x$, is directed toward the edge 44 of the object 40 and substantially parallel to its flat surface 42 (i.e. into the page in FIG. 2B), the object 40 is not so easily detected. On the other hand, when the z component of a magnetic field, $B_z$ is directed perpendicularly toward the flat surface 42 of the object 40 as shown in FIG. 2A, the object 40 will be rather easily detected. Nevertheless, the presence of the loop(s) 36 can easily interfere with the z component of the magnetic field, $B_z$ (FIG. 2A), and make what would otherwise be an relatively easy detection of the object 40 a near impossibility. In order to overcome this difficulty, the excitation coils 14 and the sensing coils 16 need to be specifically designed to avoid interference of $B_z$ that may be caused by the loop(s) 36.

When referring to FIG. 3 it will understood that the excitation coils 14 and the sensing coils 16 are substantially the same and that they are effectively interchangeable. Stated differently, there is reciprocity between the excitation coils 14 and the sensing coils 16. As shown in FIG. 3 the excitation coils 14 and the sensing coils 16 each comprise an array of individual coils. Specifically, these individual coils are a sine coil 46, a first cosine coil 48 and a second cosine coil 50. More specifically, the sine coil 46 is used to generate or receive a magnetic field whose z component, $B_z$, exhibits a spatial intensity pattern that is represented by the sine wave 52 in FIG. 4A. Similarly, the first cosine coil 48 and the second cosine coil 50 will function together to generate or receive a magnetic field whose z component, $B_z$, exhibits a spatial intensity pattern that is represented by the cosine wave 54 in FIG. 4A. Thus, the z component of the magnetic field which is respectively generated or received by the excitation coils 14 and the sensing coils 16 will be alternated between a sinusoidal component and a cosinusoidal component.

As intended for the present invention, the spatial intensity patterns of the sinusoidal and cosinusoidal components will be alternated approximately between 10 and 100 times per second. Further, the sinusoidal and cosinusoidal components of the magnetic field will preferably be respectively generated by the sine coil 46 and the cosine coils 48,50 using 10 volts (peak to peak) at a frequency in the range of one to ten megahertz (1–10 Mz). Additionally, in order to accommodate suitcases 34 having characteristic dimensions in the range of from fifty to eighty centimeters (50 cm–80 cm), the sine coil 46 will have a dimension of approximately 80 cm, the first cosine coil 48 will likewise have a dimension of approximately 80 cm, and the second cosine 50 will have a dimension of approximately 50 cm.

Operation

In the operation of the device 10, the suitcase 34 is placed lengthwise on the conveyor belt 22 and advanced into the chamber 30 substantially as shown. As the suitcase 34 passes the dimension detector 18, its characteristic dimension 38 (length) is recorded by the computer 20. For the present invention, the characteristic dimension 38 will typically be between 50 cm and 80 cm. Accordingly, as disclosed above, the sine coil 46 and cosine coil 50 will both be approximately 80 cm in length. The cosine coil 52, on the other hand, will be approximately 50 cm in length.

Inside the chamber 30 of base 12, when the suitcase 34 is positioned substantially as shown on the path 56 between the excitation coils 14 and the sensing coils 16, the excitation coils 14 are activated. With this activation, a magnetic field is generated which will have a z component, $B_z$, that is directed substantially along the path 56 from the excitation coils 14 to the sensing coils 16. As disclosed above, $B_z$ has a sinusoidal component which is alternated with a cosinusoidal component. For the present invention, the cosinusoidal component of $B_z$ is adjustable.

Consider the situation wherein the characteristic dimension 38 of the suitcase 34 is 80 cm. In this case, $B_z$ of the magnetic field will be alternately generated by the sine coil 46 (80 cm) and only the cosine coil 48 (80 cm). The cosine coil 50 (50 cm) will not be needed. The result is alternating spatial intensity patterns represented by the sine wave 52 and the cosine wave 54 in FIG. 4A. For reasons set forth above, because the loop 36 of suitcase 34 has a characteristic dimension 38 that is equal to approximately 80 cm, the loop 36 will not interfere with $B_z$. The object 40, however, will interfere with $B_z$, and will cause perturbations in the magnetic field which will be detected by the sensing coils 16. Signals of these perturbations will then be sent via line 28 to the computer 20 where an alarm can be initiated that will indicate the presence of the article 40 inside the suitcase 34.

Next, consider the situation wherein the suitcase 34 has a characteristic dimension 38 which is less than 80 cm. In this case, the cosinusoidal component of $B_z$ will need to be adjusted to comport with the shorter dimension. Specifically, using the characteristic dimension 38 measured by the dimension detector 18, the computer 20 will appropriately adjust both the cosine coil 48 and the cosine coil 50. It should be noted that if the characteristic dimension 38 happens to be 50 cm, this will comport directly with the dimension of cosine coil 50, and only the cosine coil 50 is needed. In this particular instance, the cosine coil 48 would not be used. However, when the characteristic dimension 38 is between 50 cm and 80 cm, then the cosine coils 48 and 50 both need to be proportionately activated. The result in all cases wherein the characteristic dimension is less than 80 cm will be a spatial intensity pattern such as represented by the cosine wave 54' in FIG. 4B. Again, for reasons set forth above, because the cosine loops 48 and 50 are adjusted to the characteristic dimension 38, the loop 36 will not interfere with $B_z$. The object 40, however, will interfere with $B_z$, and will cause perturbations in the magnetic field which will be detected by the sensing coils 16. Signals of these perturbations will then be sent via line 28 to the computer 20 where an alarm can be initiated that will indicate the presence of the article 40 inside the suitcase 34.

While the particular Baggage Metal Detector as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A device for detecting random conducting objects located inside a conducting loop, the loop being substantially planar in its configuration and having a characteristic dimension, said device comprising:

a base;

electronic means mounted on said base for determining the characteristic dimension of the loop;

an array of excitation coils mounted on said base for generating magnetic fields along a path toward the objects, said path being substantially perpendicular to the plane of the loop, and said magnetic fields having spatial intensity patterns matched to the characteristic dimension of the loop to substantially eliminate perturbations of said fields caused by the loop;

an array of sensing coils mounted on said base along said path for receiving said fields when the objects inside the loop are located on said path between said array of excitation coils and said array of sensing coils; and electronic means connected with said sensing coils for discerning perturbations in said fields caused by the objects to detect the objects.

2. A device as recited in claim 1 wherein said spatial intensity patterns include a sinusoidal component and a cosinusoidal component, and wherein said sinusoidal component and said cosinusoidal component are sequentially alternated during generation of said fields.

3. A device as recited in claim 1 wherein said array of excitation coils comprises:

a first cosine coil;

a second cosine coil; and a sine coil.

4. A device as recited in claim 3 wherein said first cosine coil and said sine coil each have a length of approximately eighty centimeters (80 cm), and said second cosine coil has a length of approximately fifty centimeters (50 cm).

5. A device as recited in claim 4 further comprising means for adjusting said first cosine coil and said second cosine coil to match said cosinusoidal component with said characteristic dimension of the loop.

6. A device as recited in claim 3 wherein said array of sensing coils is substantially the same as said array of excitation coils.

7. A device as recited in claim 1 further comprising a plurality of said loops and wherein said loops interact as reinforcing frames for a suitcase.

8. A device as recited in claim 1 further comprising a conveyor belt mounted on said base for moving the objects inside the loop into a position on said path between said array of excitation coils and said array of sensing coils.

9. A device as recited in claim 8 wherein said array of sensing coils is activated when the objects inside the loop are in said position on said path.

10. A device for selectively detecting random conducting objects located inside a conducting loop, the loop being substantially planar in its configuration and having a characteristic dimension, said device comprising:

a base;

a conducting means mounted on said base for generating a magnetic field directed along a path toward the objects, said path being substantially perpendicular to the plane of the loop;

a sensing means mounted on said base for discerning perturbations in said magnetic field caused by the objects to detect the objects; and a means mounted on said base for adjusting said magnetic field to substantially eliminate mutual inductance with the loop for selective detection of said objects inside the loop.

11. A device as recited in claim 10 wherein said magnetic field includes a sinusoidal component and a cosinusoidal component, and wherein said sinusoidal component and said cosinusoidal component are sequentially alternated.

12. A device as recited in claim 10 wherein said conducting means is an array of excitation coils comprising a first cosine coil, a second cosine coil and a sine coil.

13. A device as recited in claim 12 wherein said first cosine coil and said sine coil each have a length of approximately eighty centimeters (80 cm), and said second cosine coil has a length of approximately fifty centimeters (50 cm).

14. A device as recited in claim 12 further comprising means for adjusting said first cosine coil and said second cosine coil to match said cosinusoidal component with said characteristic dimension of the loop.

15. A method for selectively detecting random conducting objects located inside a conducting loop, the loop being substantially planar in its configuration and having a characteristic dimension, said method comprising the steps of:

generating a magnetic field directed along a path from a remote location toward the objects and the loop, said path being substantially perpendicular to the plane of the loop;

adjusting said magnetic field to substantially eliminate mutual inductance between the loop and said conducting means; and sensing perturbations in said magnetic field caused by the objects to selectively detect the objects inside the loop.

16. A method as recited in claim 15 wherein said magnetic field includes a sinusoidal component and a cosinusoidal component, and said method further comprises the step of sequentially alternating said sinusoidal component and said cosinusoidal component in said magnetic field during detection of the objects.

17. A method as recited in claim 15 wherein said directing step is accomplished using an array of excitation coils comprising a first cosine coil, a second cosine coil and a sine coil, and wherein said first cosine coil and said sine coil each have a length of approximately eighty centimeters (80 cm), and said second cosine coil has a length of approximately fifty centimeters (50 cm), and wherein said adjusting step is accomplished by adjusting said first cosine coil and said second cosine coil to match said cosinusoidal component with said characteristic dimension of the loop.

18. A method as recited in claim 17 further comprising the step of moving the objects inside the loop into a position on said path.

19. A method as recited in claim 18 further comprising the step of accomplishing said sensing step when the objects inside the loop are in said position on said path.

20. A method as recited in claim 19 wherein there are a plurality of said loops and said loops interact as reinforcing frames for a suitcase.

\* \* \* \* \*